Feb. 14, 1967 J. F. WELLS ET AL 3,304,477

BUFFER POSITION SENSING AND REEL MOTOR CONTROL FOR A MAGNETIC TAPE TRANSPORT

Filed Dec. 31, 1963 2 Sheets-Sheet 1

INVENTORS
JACK F. WELLS
LEONARD H. THOMPSON

BY Bernard M. Goldman

ATTORNEY

United States Patent Office 3,304,477

Patented Feb. 14, 1967

3,304,477

BUFFER POSITION SENSING AND REEL MOTOR CONTROL FOR A MAGNETIC TAPE TRANSPORT

Jack F. Wells and Leonard H. Thompson, Poughkeepsie, N.Y., assignors to International Business Machines Corporation, New York, N.Y., a corporation of New York Filed Dec. 31, 1963, Ser. No. 334,845
6 Claims. (Cl. 318—7)

This invention relates generally to sensing the position of a buffer arm in a tape transport to enable independent control for each reel drive motor.

In the prior art, spring finger contacts are used for sensing the position of the buffer arm in a tape transport, as described in U.S. Patent 2,904,275 to W. T. Selsted and R. M. Brumbaugh. However, such spring finger contacts also have generally required damping means (such as a dash-pot) to reduce a bounce problem for the contacts when they are engaged by the buffer arm. Such prior switching means also tended to interfere with buffer arm movement by causing non-linear mechanical loading of the buffer arm.

It is the primary object of this invention to provide a switch arrangement with a buffer arm in a tape transport having both simplicity and great reliability, and not having inherent problems found with prior sensing devices.

It is another object of this invention to provide a simple switch for buffer arm operation in a tape transport which need not significantly load the buffer arm, nor interfere with buffer arm movement.

It is a further object of this invention to provide a buffer arm switch in a tape transport not requiring any additional damping means.

It is a still further object of this invention to provide a switch for a tape buffer arm which does not significantly increase the inertia of the buffer arm and does not require any mechanical engagement between the buffer arm and switch.

It is still another object of this invention to provide a switch for a tape buffer arm involving only the actuation or deactuation of a magnetic field coupling, permitting very fast actuation of the switching means.

This invention uses a read switch and magnet in conjunction with the buffer arm in a tape transport. The flux field of the magnet reaching the reed switch is controlled by the position of the buffer arm. Thus, the buffer arm can vary the separation distance between the magnet and reed switch; or in a preferred embodiment for buffer arm controls the position of a magnetic shield which at a particular buffer arm position blocks the magnetic field from the reed switch to deactuate it.

The foregoing and other objects, features and advantages of the invention will be apparent from the following more particular description of the preferred embodiment of the invention, as illustrated in the accompanying drawings.

Figure 1:
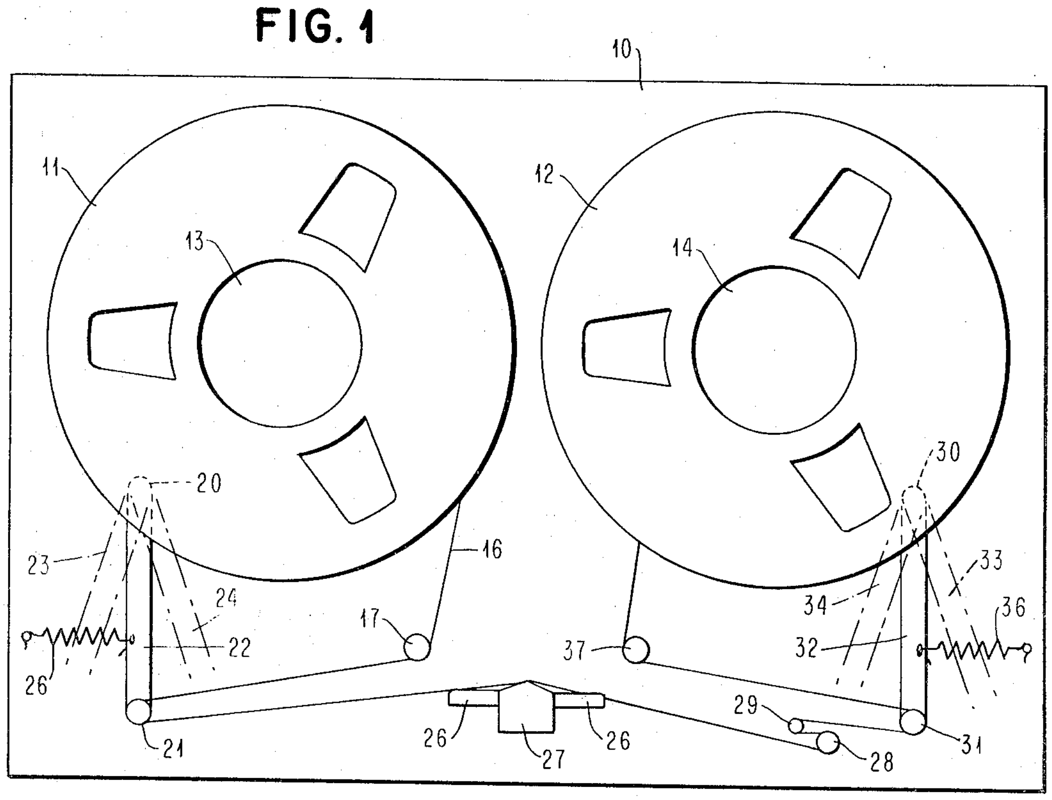
FIGURE 1 is a front view of a transport having buffer arms which can utilize the invention.

FIGURE 1 illustrates the front view of a tape transport which may utilize the invention. The tape transport includes a frame 10 supporting rotatably a pair of reel spindles 13 and 14 on which are fastened a supply reel 11 and a take-up reel 12, respectively.

A pair of buffer arms 22 and 32 respectively pivot about journal shafts 20 and 30 respectively supported by bearings in frame 10. Idlers 21 and 31 are rotatably mounted at the opposite end of respective buffer arms 22 and 32. Each buffer arm is biased by a spring 26 or 36, each fastened between a buffer arm and frame 10.

A magnetic tape 16 moves from supply reel 11 over an idler 17 rotatably supported by frame 10, around buffer arm idler 21, over a tape guide 26 with read, write, erase head assembly 27, and wraps about 180 degrees around a capstan 28 driven by either a continuous or incremental motor. The tape then passes over idlers 29, 31 and 37 to take-up reel 12.

Figure 2:
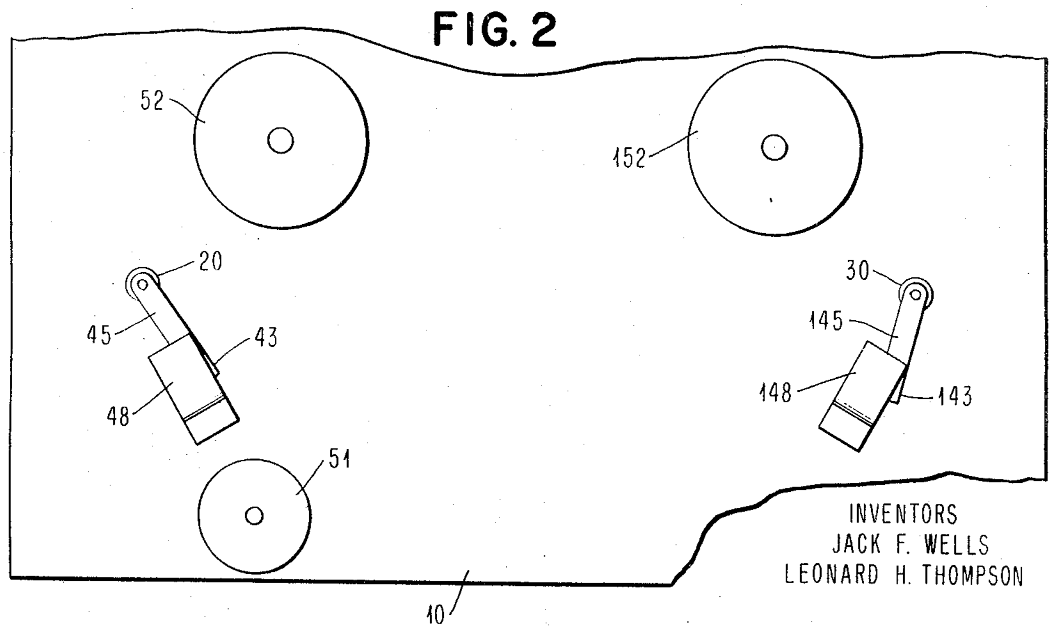
FIGURE 2 is a back view of the transport shown in FIGURE 1 for illustrating an embodiment of the invention.

FIGURE 2 shows a back view of the transport. Reel drive motors 52 and 152 are respectively coupled to reel spindles 13 and 14. A pair of magnetic shields 43 and 143 are connected by supporting members 45 and 145, respectively, to the journal shafts 20 and 30. Thus shields 43 and 143 are movable with buffer arms 22 and 32 respectively. Each shield is made of thin metal having high permeability, low coercive force and not easily magnetized. An example of such metal can be the steel used for core laminations in electrical power transformers.

Figure 3:
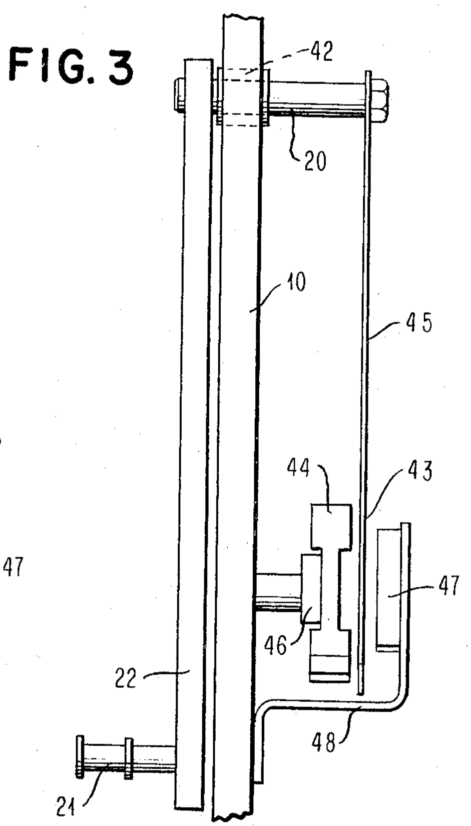
FIGURE 3 shows a side view of the switch operating portion in FIGURE 1.

As shown in FIGURE 3, a bearing 42 is fixed within frame 10 for supporting rotatably shaft 20. Shield 43 is fastened at the end of shield support 45. The shield passes between a reed switch 44 fixed by a bracket 46 to frame 10 and a permanent magnet 47 fixed by a bracket 48 to frame 10. Without the intervention of shield 43, the magnetic flux from magnet 47 causes engagement of a pair of reed contacts of switch 44 by inducing a flux circuit through the contacts; the flux circuit causes engagement of the contacts by inducing magnetic attraction between them. Whenever shield 43 is interposed between magnet 47 and reed switch 46, the magnetic flux is blocked from reaching the reed switch; and the flux circuit through the contacts is interrupted. As a result the contacts instantly open under a spring bias normally urging the contacts to separate. Reed switch 44 may be of the type well known in the art. Its contacts are separated by a fraction of a thousandth of an inch, and they are closed in a few hundred microseconds whenever the flux through them builds up above a threshold level.

The two sets of electrical contacts (reed switch pair) within switch 44 are electrically independent. They are used to control separate silicon control rectifiers (SCR) which receive different electrical phases. Only one set of switch contacts is required as a theoretical minimum, although two sets of contacts provide more efficient operation for the particular embodiment described in detail herein.

Figure 4:
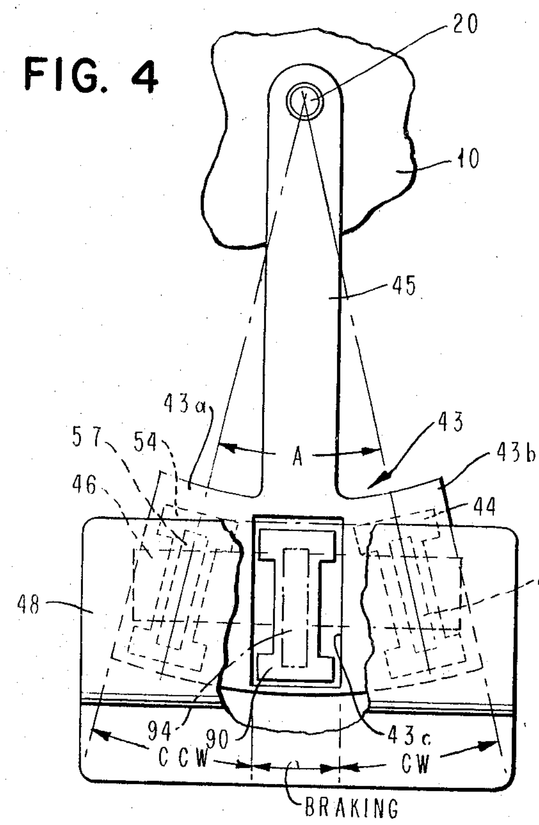
FIGURE 4 shows an elevational view of the switch shown in FIGURE 3.

As shown in FIGURE 4, three permanent magnets 47, 94 and 57 are fastened to bracket 48; and three reed switch pairs 44, 90 and 54 are fastened to bracket 46.

The two switch pairs 44 and 54 are spaced apart by an angle A. The shield 43 comprises two shield elements 43*a* and *b* with an opening 43*c* between them. The angle of movement for shield 43 (or 143), during which the respective reel motor 52 (or 152) is not actuated and remains in a braking status to hold reel 11 (or 12) stationary, is determined by the width of shield opening 43*c*. The width of shield sections 43*a* or 43*b* affects the amount of movement permitted for the buffer arm during which the motor receives actuation. When shield section 43*a* uncovers switch 54, while shield section 43*b* is covering switch 44, the motor 52 is driven counterclockwise. On the other hand when shield section 43*b* uncovers switch 44, while shield section 43*a* is covering switch 54, motor 52 is driven clockwise.

Whenever a tape drive is to be used only for one direction of rotation for its reel with mechanical buffer arm operation, one set of switch contacts within 44 or 54 may be eliminated, since as a theoretical minimum only one reed switch of the pair need remain. In this case only a single section shield need be provided rather than the two section shield shown in FIGURE 4. FIGURE 2 illustrates a simple single section shield with the shield 43 being merely an extension of shield support 45. Furthermore, such single set of contacts can also be used for bidirectional motor operation by providing logic circuitry similar to that found in prior tape drives having within each vacuum column a single vacuum switch, such as the IBM 7330 Tape Drive.

The amount of movement of the buffer arm needed for shield 43 (or 143) to traverse the distance between switch pairs 44 and 54 is a function of the mechanical advantage in the coupling between each buffer arm and its shield. This mechanical advantage can be increased by lengthening shield support 43; or other means can be used for increasing the mechanical advantage, such as a gear train, pulley arrangement, etc. between a buffer arm and its shield.

Figure 5:
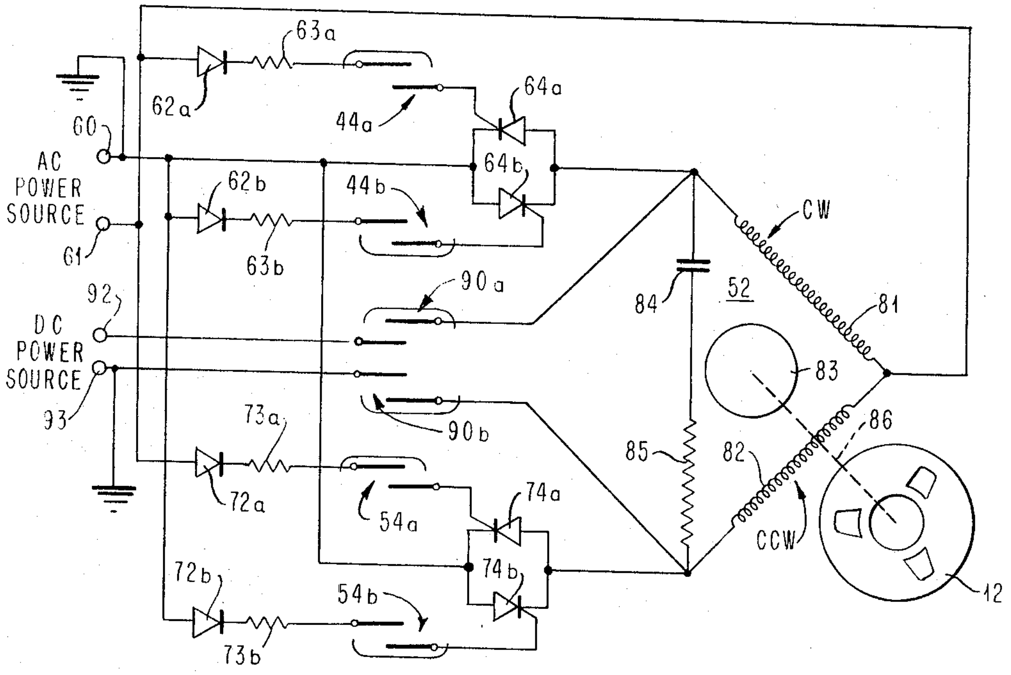
FIGURE 5 is a schematic diagram of a reel motor control circuit which may be used with the transport shown in FIGURE 1.

FIGURE 5 illustrates a circuit containing three pairs of reed switches 44, 90 and 54 for controlling the clockwise (CW) and counterclockwise (CCW) rotation of motor 52. An identical circuit may be provided for the other reel drive motor 152. Each motor 52 (or 152) has a pair of stator windings 81 and 82 which are separately energized to control clockwise and counterclockwise rotation for a permanent magnet armature 83. Rotor 83 is coupled to reel spindle 13 for driving reel 12. Motor 52 (or 152) may be a synchronous inductor motor of the type described in an article published in the March 1962 issue of "Applications and Industry" by the A.I.E.E., paper 61–650, by A. E. Snowden and E. W. Madsen, titled "Characteristics of a Synchronous Inductor Motor."

Windings 81 and 82 are connected together at one end to a terminal 61 of an A.C. power source having its opposite side connected to ground at terminal 60. The other end of each winding 81 and 82 is connected to an opposite end of a series R-C network comprising a capacitor 84 and a resistor 85.

Winding 81 receives power from a pair of silicon controlled rectifiers 64*a* and *b*. Similarly winding 82 receives power from another pair of silicon controlled rectifiers 74*a* and *b*.

Reed switch pair 44 comprises contact sets 44*a* and *b*, which respectively control silicon controlled rectifiers 64*a* and *b*. Similarly reed switch pair 54 comprises contact sets 54*a* and *b*, which control silicon controlled rectifier pair 74*a* and *b*.

Reed switch contacts 44*a* connect at one end to the gate electrode of silicon controlled rectifier 64*a*. A diode 62*a* and resistor 63*a* are connected in series between the opposite end of reed switch 44*a* and power terminal 61 for providing forward bias to the gate electrode.

In a similar manner, reed switch contacts 44*b* are connected in series with diode 62*b* and resistor 63*b* between terminal 60 to forward bias the gate electrode of silicon controlled rectifier 64*b*. The anode of rectifier 64*a* and cathode of rectifier 64*b* are connected in common to an end of motor winding 81. The cathode of 64*a* and anode of 64*b* are connected in common to power terminal 60.

Likewise the reed switch contact sets 54*a* and *b* are connected to rectifiers 74*a* and *b*. Thus switch 54*a*, resistor 73*a* and diode 72*a* are connected in series from power terminal 61 to forward bias the gate electrode of rectifier 74*a*. Similarly reed contact 54*b*, resistor 73*b*, and diode 72*b* are connected in series from power terminal 60 to forward bias the gate electrode of rectifier 74*b*. The anode of 74*a* and cathode of 74*b* are connected in common to an end of the other motor winding 82. The cathode of 74*a* and anode of 74*b* are connected in common to terminal 60.

The synchronous inductor motor 52 (or 152) has a permanent magnet (P.M.) roto 83 which provides inherent braking when no power in applied. However, the braking characteristic of the motor can be improved by providing a direct current (D.C.) to either or both stator windings 81 and 82. For this purpose a reed switch 90 is provided with contacts 90*a* and 90*b* that are normally open. The movement of the shield through its braking region aligns the opening 43*c* in shield 43 to permit the flux of a permanent magnet 94 on bracket 48 to close contacts 90*a* and *b* and thereby to apply braking D.C. to the motor. When the shield moves to unblock flux to either of switches 44 or 54, contacts 90*a* and *b* are shielded from magnet 94 to cause contacts 90*a* and *b* to open and remove the D.C.

Each silicon controlled rectifier only provides an output on the half-cycle which drives the anode positive with respect to the gate electrode.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, and a circuit connecting said reed switch to said reel motor for driving it in a particular direction to change tape tension on said buffer arm when the buffer arm movement actuates said reed switch, said reed switch including first and second contact sets, a silicon controlled rectifier pair having a pair of gate electrodes, an alternating-current power source having opposite terminals respectively connected to said gate electrodes in series with said first and second contact sets.

2. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, and a circuit connecting said reed switch to said reel motor for driving it in a particular direction to change tape tension on said buffer arm when the buffer arm movement actuates said reed switch, a second reed switch and magnet arranged adjacent to said one reed switch and magnet, said second reed switch being located relative to said buffer arm at a position where its actuation indicates a proper tape buffer length, and a direct-current power source being connected to said motor through said second reed switch for braking said motor upon actuation of said second switch.

3. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, and a circuit connecting said reed switch to said reel motor for driving it in a particular direction to change tape tension on said buffer arm when the buffer arm movement actuates said reed switch, a second reed switch and magnet arranged adjacent to said one reed switch and magnet, said second reed switch being located relative to said buffer arm at a position where its actuation indicates a proper tape buffer length, and a direct-current power source being connected to said motor through said second reed switch for braking said motor upon actuation of said second switch, and said motor being a synchronous inductor motor.

4. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, and a circuit connecting said reed switch to said reel motor for driving it in a particular direction to change tape tension on said buffer arm when the buffer arm movement actuates said reed switch, said magnet and reed switch connected in fixed positions on said drive, and an electromagnetic shield having a slot therein being actuated by said buffer arm from movement between said limits, said shield passing between said magnet and said buffer arm, and said opening being aligned between said reed switch and magnet at each buffer arm position causing switch actuation.

5. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, and a circuit connecting said reed switch to said reel motor for driving it in a particular direction to change tape tension on said buffer arm when the buffer arm movement actuates said reed switch, a second reed switch and magnet arranged adjacent to said one reed switch and magnet, said second reed switch being located relative to said buffer arm at a position where its actuation indicates a proper tape buffer length, a direct-current power source being connected to said motor through said second reed switch for braking said motor upon actuation of said second switch, a third reed switch and magnet positioned on the opposite side of said second reed switch from said first reed switch, and said third reed switch being located relative to said buffer arm at a position where its actuation indicates an improper tape buffer length opposite from the improper tape buffer length indicated by actuation of said first reed switch.

6. A buffer tape-length control for a drive having a pair of tape buffer arms respectively associated with a pair of tape reels, each buffer arm controlling a buffer length of tape adjacent a tape processing station, each buffer arm being movable between two limits relative to said processing station, each buffer arm having associated with it:

at least a first reed switch and a magnet arranged for switch actuation by buffer arm movement within said limits, a reel motor for driving each reel, a circuit connecting said reed switch to said reel motor for driving it in a particular direction to change tape tension on said buffer arm when the buffer arm movement actuates said reed switch, a second reed switch and magnet arranged adjacent to said one reed switch and magnet, said second reed switch being located relative to said buffer arm at a position where its actuation indicates a proper tape buffer length, a direct-current power source being connected to said motor through said second reed switch for braking said motor upon actuation of said second switch, a third reed switch and magnet positioned on the opposite side of said second reed switch from said first reed switch, said third reed switch being located relative to said buffer arm at a position where its actuation indicates an improper tape buffer length opposite from the improper tape buffer length indicated by actuation of said first reed switch, an electromagnetic shield fastened to said buffer arm for movement continuously between said reed switches on one side of said shield and said magnets on the other side, a single slot formed through said shield, said slot being positioned between said second reed switch and its magnet when said tape buffer length is proper, and said motor being actuated in opposite directions by actuation of said first and third reed switches in a direction to change the tape buffer length back to the proper length.

References Cited by the Examiner

UNITED STATES PATENTS

| | | | |
|---|---|---|---|
| 2,722,649 | 11/1955 | Immel | 318—227 |
| 2,873,318 | 2/1959 | Moore | 318—212 X |
| 3,087,030 | 4/1963 | Sherbanow | 200—87 |
| 3,131,339 | 4/1964 | Burr | 318—6 |
| 3,199,093 | 8/1965 | Cheney | 200—87 X |
| 3,201,537 | 8/1965 | Klatte et al. | 200—87 X |

ORIS L. RADER, *Primary Examiner.*

G. A. FRIEDBERG, G. Z. RUBINSON, *Assistant Examiners.*